United States Patent
Bass et al.

[11] Patent Number: 5,589,980
[45] Date of Patent: *Dec. 31, 1996

[54] THREE DIMENSIONAL OPTICAL VIEWING SYSTEM

[76] Inventors: Robert Bass; John Bass, both of 2832 NE. 35th St., Fort Lauderdale, Fla. 33306

[*] Notice: The term of this patent shall not extend beyond the expiration date of Pat. No. 5,086,254.

[21] Appl. No.: 256,402

[22] PCT Filed: Dec. 23, 1991

[86] PCT No.: PCT/US91/09737

§ 371 Date: Jun. 23, 1994

§ 102(e) Date: Jun. 23, 1994

[87] PCT Pub. No.: WO93/13446

PCT Pub. Date: Jul. 8, 1993

[51] Int. Cl.$^6$ .................................................. G02B 27/22
[52] U.S. Cl. .................. 359/478; 359/479; 359/32; 348/42; 345/9
[58] Field of Search ........................ 359/22, 23, 24, 359/67, 462, 465, 472, 478, 479, 629, 630, 32, 33, 13; 345/4–6, 9, 114, 42; 348/47

[56] References Cited

U.S. PATENT DOCUMENTS

| | | | |
|---|---|---|---|
| 2,693,128 | 11/1954 | Dewhurst | 359/471 |
| 2,736,250 | 2/1956 | Papritz | 354/117 |
| 3,079,959 | 3/1963 | Johnston | 40/489 |
| 3,399,993 | 9/1968 | Agnew | 430/394 |
| 3,515,454 | 6/1970 | Paganelli | 359/471 |
| 3,695,878 | 10/1972 | Salyer et al. | 354/112 |
| 3,891,305 | 6/1975 | Fader | 359/478 |
| 4,178,090 | 12/1979 | Marks et al. | 354/117 |
| 4,190,856 | 2/1980 | Ricks | 348/42 |
| 4,295,153 | 10/1981 | Gibson | 348/49 |
| 4,437,745 | 3/1984 | Hajnal | 354/117 |
| 4,480,893 | 11/1984 | Fantone | 359/465 |
| 4,487,490 | 12/1984 | McKee | 354/115 |

(List continued on next page.)

OTHER PUBLICATIONS

The PC Viewer (PC 6448C) by In Focus Systems, Inc. (Sales Brochure) (Not Dated).
The PC Viewer (PC 6448C+2) by In Focus Systems, Inc. (Sales Brochure) (Not Dated).
Kodak Datashow HR/M Projection Pad (Sales Brochure) (1988).
MacView Frame Projection Display, by nView Corporation (Sales Brochure) (1988).
Mac Data Display by Computer Accessories Corp. (Specification Sheet Jun. 17, 1988).
Overhead Displays (PC Magazine, Mar. 15, 1988).

*Primary Examiner*—Paul M. Dzierzynski
*Assistant Examiner*—Darren E. Schuberg
*Attorney, Agent, or Firm*—Quarles & Brady

[57] ABSTRACT

Optical viewing system for producing a simulated three dimensional image. The system includes electronic equipment for displaying an image on a first electronic display device. Additional electronic equipment is provided for displaying an image on at least one second display device. The at least one second electronic display device is a substantially transparent display device, whereby an observer can view through transparent areas of the second electronic display device. The first and second electronic display devices are located at different, predetermined locations along an optical viewing path such that the image displayed by the first electronic display device is projected through the second electronic display device. The first electronic display device includes an image projector and the second electronic display device includes a controllable pixel display spaced therefrom. The controllable pixel display is comprised of a positive pixel display panel having a field of pixel elements which are controllably illuminated. The controllable pixel display is substantially transparent such that the image produced by the controllable pixel display is overlaid upon the image produced by the image projector. A recording system including at least two image recorder channels is also disclosed for producing a plurality of images for simulating a three dimensional scene.

7 Claims, 4 Drawing Sheets

U.S. PATENT DOCUMENTS

| | | | |
|---|---|---|---|
| 4,541,692 | 9/1985 | Collins et al. | 359/48 |
| 4,552,442 | 11/1985 | Street | 354/112 |
| 4,559,556 | 12/1985 | Wilkins | 348/58 |
| 4,573,759 | 3/1986 | Swift | 359/32 |
| 4,647,966 | 3/1987 | Phillips et al. | 348/58 |
| 4,687,310 | 8/1987 | Cuvillier | 354/115 |
| 4,695,130 | 9/1987 | Medina et al. | 359/464 |
| 4,740,836 | 4/1988 | Craig | 348/49 |
| 5,086,354 | 2/1992 | Bass et al. | 359/465 |

THREE DIMENSIONAL OPTICAL VIEWING SYSTEM

BACKGROUND OF THE INVENTION

1. Field of the Invention

The present invention relates to an optical viewing system that produces a simulated three dimensional image which can be viewed by individuals.

2. Prior Art

Humans have binocular vision for perceiving three dimensional scenes, that is, scenes having depth as well as height and width. A single viewing apparatus such as a single human eye, can perceive scenes only to dimensionally. The perception of depth in a three dimensional space is due to the difference in the angle or relative position of features of the scene at different distances from the viewer, in views taken from to spaced points of view, also known as parallax.

It is known to simulate a three dimensional image using dual two dimensional media. Two images of the same scene are prepared, each being a two-dimensional view of the three dimensional scene, but the two being taken from laterally spaced positions. When viewing one image with one eye and the other image with the other eye, the viewer perceives the image to have depth, in the same manner that the user's eyes perceive depth in actual three dimensional scenes.

An individual can view such a specially processed or configured dual two dimensional image through special eyeglasses. For example, the dual images can be superimposed on one two dimensional viewing area and separated using light polarization. One of the dual two-dimensional images is presented in light polarized at one angle, and the other i presented in light polarized 90° out of phase with the first. The observer views the superimposed images through eyeglasses which have lenses polarized in a complementary manner to separate the dual images such that one is presented to each eye. Each lens transmits one form of polarized light and inhibits passage of the other form of polarized light. The eyes of the viewer essentially receive images of the three dimensionally scene from different perspectives, and the brain interprets the dual two dimensional images as one scene having depth.

Various optical systems for producing three dimensional images in this manner are known, such as systems using lenticular lenses and films, and other stereoscopic systems which include lenses or prisms for transmitting the two images separately, one to each eye. Normally, stereoscopic scenes are static. However, moving pictures can also be accomplished. The two images can be projected from a single two dimensional projection, and separated by use of complementary colors, polarization or distinct diffracted light paths. In U.S. Pat. No. 4,740,836—Craig, dual two dimensional images taken from slightly different perspectives are displayed side by side on one CRT, and are recombined for viewing using prisms which diffract the light from the lateral sides of the CRT so that each eye views one side of the CRT only. In U.S. Pat. No. 4,647,966—Phillips et al, two images at distinct polarization angles are projected on one view screen and are viewed through polarized glasses. See also, for example, U.S. Pat. Nos. 4,487,490; 4,552,443; and 3,695,878.

A somewhat different form of three dimensional image can be provided by producing two or more two-dimensional images or image layers which are projected to appear at different distances from the observer, and are viewed through one another with both eyes. Each layer shows only those elements of the three dimensional scene which are at equal distance from the viewer of the scene, each image layer then being projected such that the features in the nearer levels appear to be placed closer to the observer and in front of the features of one or more layers in a more remote level. In a simplest form, a two dimensional image showing only items in a foreground scene (being otherwise transparent) is presented in front of a two dimensional image of a background scene, the apparent spacing of the foreground and the background layers providing the image with depth. More complex forms can have a plurality of layers.

The latter, layered form of display has a number of implications for projection and viewing. In a layered projection the observer's binocular vision is used directly to provide the perception of depth, unlike stereoscopic systems wherein the perception of depth is provided by presenting different views to the respective eyes. It is the lateral spacing of the observer's eyes that provides the difference in views, or parallax. A layered three dimensional scene is not the same from all angles relative to the viewing screen as it is in a separated perspective or stereoscopic image system wherein the separation of the cameras or the like which recorded the scene defines the parallax. Viewing a layered three dimensional scene can be more comfortable for the observer than viewing stereoscopic images, which may require substantial concentration.

Layered two dimensional images are geometrically less complicated than stereoscopic images because less attention is required with respect to angles. However layered images involve the further step of separating the foreground features (for presentation in a transparent field) from the background features (viewed through the transparent field). Layered images also require a substantially different projection apparatus than stereoscopic images, for projecting the layers at different apparent distances from the observer. Nevertheless, layered two dimensional images are appropriate and useful, especially due to the lack of angular complexity in the recording phase.

In U.S. Pat. No. 4,190,856—Ricks, a three dimensional television apparatus based on superimposed two dimensional layers is disclosed. However the apparatus is complex, and notwithstanding the complexity there are certain problems that are encountered, for example with respect to opacity of the foreground features and the size of the projection apparatus. The projection of individual layers is achieved using plural projection CRTs. CRTs inherently define a substantial length along the center axis or Z axis of the electron beam, and also occupy a relatively large space laterally of the Z axis, for the deflection yoke. The individual CRTs according to Ricks are disposed at lateral spaces and along orthogonal axes in order to provide space for the CRTs. The image from each CRT is transmitted along a respective path, the paths traversing full and/or half silvered mirrors whereby the images are combined to appear at different perspectives. According to one embodiment the foreground images are reduced in size for recombination, requiring lenses, and resulting in a composite image wherein the image from a foreground layer is overlaid on only a part of a larger background layer. For a four layer arrangement, even using images of equal size, the arrangement is quite complex.

It would be desirable to provide a three dimensional simulation which at the same time is compact, easy to operate and easy to view, wherein the image layers can readily be processed to provide an effective three dimensional view of a scene, preferably a moving picture scene, with minimal complexity.

SUMMARY OF THE INVENTION

It is an object of the present invention to provide an optical viewing system that produces a simulated, three dimensional image from two or more two-dimensional images which are projected at different apparent distances from the observer, and viewed through one another.

It is another object of the present invention to provide an optical viewing system which can display conventional two dimensional images or, alternatively, simulated three dimensional images.

It is another object of the present invention to provide an optical viewing system which produces special visual effects by reversing the foreground and background images.

It is an additional object of the present invention to provide an optical viewing system wherein the foreground image can be electronically processed distinct from the background image thereby enabling dynamic change of the foreground with respect to the background.

It is another object of the present invention to intermix images projected from different sources, e.g., overlaying an image from a video monitor with an image from a computer monitor.

It is a further object of the present invention to provide a simulated and sequential, three dimensional image with multiple two dimensional image projectors and multiple audio sources whereby a three dimensional image appears to change its relative location with respect to the background image and the audio signals track the relative change of the foreground images.

It is another object of the present invention to utilize a transparent liquid crystal display (herein LCD) screen to produce the foreground image.

It is an additional object of the present invention to provide an optical viewing system which displays randomly generated optical effects in simulated 3D.

In one embodiment, the optical viewing system produces a simulated three dimensional image having one or more foreground layers wherein features are placed on a substantially transparent field, and one or more background features are projected to appear behind the foreground layer(s). The device can utilize two video monitors and a half silvered mirror. The two dimensional image produced by one monitor is transmitted through the half silvered mirror while the second image from the second monitor is reflected from the half silvered mirror and overlaid onto the image of the first monitor.

Preferably the foreground and background layers are presented on one display screen and are superimposed by a full silvered mirror for the background, and a half silvered mirror for the foreground and for any intervening layers between the foreground and the background. The observer looks through the foreground and intervening half silvered mirrors to the background, thereby viewing overlaid layers wherein the foreground features appear closer than the background. Since the foreground and background features appear to be located at different distances from the initial point of overlay of the two images, the images appear to the observer, in the optical viewing path, to be three dimensional.

The invention is particularly useful where a high contrast foreground image is overlaid on a background. One possibility is to employ a liquid crystal display panel at least for the foreground and intervening layers, wherein pixels in the display are selectively rendered opaque. When a foreground feature in such an arrangement has a high light level (e.g., a person wearing a white shirt), it is possible to correct the tendency of the background layer to appear through the high light level feature. This can be accomplished by adjusting the background layer (i.e., masking the background area overlaid by the light foreground feature by inserting a high light level mask in the background), or by side-lighting the foreground display such that light features are positively increased in luminance.

In a simple embodiment a display surface is oriented horizontally and the foreground and background layers are projected in horizontally divided areas of the display surface. Flat half silvered mirrors are inclined over the horizontal display surface areas for the foreground and intervening layers. A full silver mirror is inclined over the last layer. The observer views the scene through the half silvered mirrors, whereby the layers are disposed at different distances from the observer and are superimposed.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an optical viewing system for producing a simulated, three dimensional image.

The basic principle behind the present invention is that a three dimensional image is simulated by projecting two two-dimensional images towards an individual when the virtual image of one of the two two-dimensional images and the actual or virtual image of the other are at different distances from the observer. This arrangement is distinct from a binocular or stereoscopic imaging technique wherein views of the same features from different perspective angles are superimposed. Unlike such a system, the invention provides a closer image having one set of features (the foreground features) which appear in front of a more distant image having an entirely different set of features (the background features). The foreground image has portions which are light transmissive such that when overlaid over the background image, the background image is transmitted and seen through those light transmissive portions of the foreground. The invention is also applicable to embodiments wherein a plurality of layers are overlaid to provide a series of overlaid features at different distances from the observer. However the invention is discussed primarily with respect to its simplest embodiment wherein one foreground image is projected over a background image such that the foreground appears closer to the observer.

Figure 1:
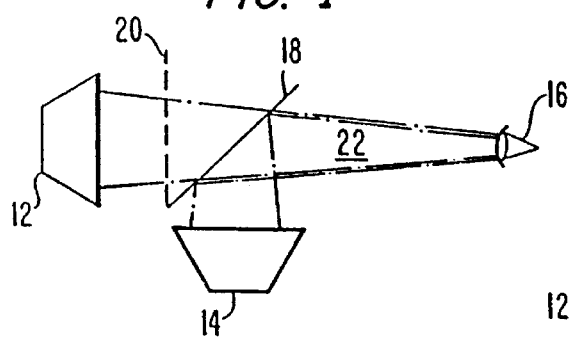
FIG. 1 schematically illustrates one embodiment of the optical viewing system utilizing two image projectors.

FIG. 1 schematically illustrates one embodiment of the invention. Means for producing the two two-dimensional images includes, in this embodiment, video monitor 12 and video monitor 14. Both monitors have screens from which the image is projected. Monitors 12 and 14 are image projectors that project two dimensional images to an observation point or observer 16 over an optical viewing path 22. The two dimensional image projected by monitor 12 is transmitted through an optical processor, in this embodiment half silvered mirror 18, to observer 16. The two dimensional image from video monitor 14 is reflected 90° by half silvered mirror 18 and is directed to observer 16. Due to the positioning of the optical processor/mirror 18, the image from monitor 14 is overlaid upon the image from monitor 12 and placed in viewing path 22. Observer 16 sees the image from monitor 14 at virtual plane 20, which as shown is closer to the observer than the image produced by monitor 12. Therefore, monitor 14 produces a foreground image and monitor 12 produces a background image. Since the images are spaced apart as thereby projected, the observer sees a simulated, three dimensional image. In the embodiment of FIG. 1, as long as the virtual image at plane 20 is spaced apart from the image produced by monitor 12, a three dimensional effect will be seen by observer 16. This three dimensional effect does not rely on any special glasses, prism or optical system to be worn or applied to the observer, and observers who view the image from different angles will see it differently, in the manner of true parallax.

The means for producing the two dimensional images can include television receivers, a video monitor that is supplied with a foreground image in one instance and a background image in another instance, or two pictures that are optically processed such that the images projected by the pictures or the light rays reflected off the pictures are overlaid upon each other and projected along an optical viewing path 22 towards observer 16. The two dimensional images may be images projected from, for example, a big screen or projected screen televisions systems, motion picture screens or other image projectors. The system can display images from different sources. For example, the real image, as viewed as reflected or emitted light from an object, could be optically processed and overlaid upon an image from a television monitor. In addition, the image source signal, obtained from a computer, could be overlaid onto an image source generated by a VCR.

The optical processor can include one or more half silvered mirrors, specially configured prisms or optical combiners which are suitably positioned to overlay the two images at different relative distances from the observer. Other specific projection techniques can also be used for similar functions. For example, the invention can be embodied with a semitransparent foreground display element such as a liquid crystal display having pixel elements which are controllably made opaque, the background being viewable through those pixels which remain transparent. Such display elements can also be stacked to provide a three dimensional block configuration. An arrangement of a plurality of layers may more convincingly simulate a three dimensional scene; however, depending on the complexity of the scene and the particular copy used, two layers may also be appropriate. Light modulating ceramic materials such as PLZT (lead lanthanum zirconate titanate) with embedded conductors, for example, can be provided in a relatively thin panel for use in a stacked configuration or otherwise arranged with multiple layers. Other means of displaying three dimensional images are also possible for displaying images which appear to be superimposed at different apparent distances from the observer.

Figure 2:
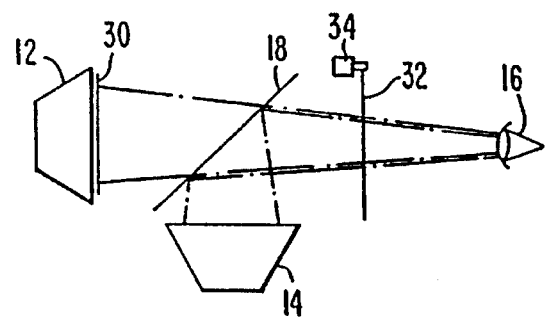
FIG. 2 schematically illustrates an embodiment of the optical viewing system including a mechanism which diminishes or enhances the background image with respect to the foreground image.

FIG. 2 schematically illustrates a system similar to that shown in FIG. 1. However, the system further includes a polarizer 30, disposed between monitor 12 and optical processor/half silvered mirror 18, and a second polarizer 32 disposed downstream from polarizer 30. Second polarizer 32 is rotated about its optical axis by a motor or other device 34 such that the relative angle, between the angle of polarization of polarizer 80 and the angle of polarization of the second polarizer 32, changes dependent upon the position of polarizer 32. In other words, polarizer 80 has a known angle of polarization such that light transmitted through polarizer 30 has a known angle of polarization. Polarizer 32 also has a known angle of polarization and alters light that passes through it such that the light contains only that angle of polarization. Assuming the angle of polarization of polarizer 30 is aligned with a reference axis, i.e., is set at 0°, and assuming that the relative angle between the axis of polarization of polarizer 32 is 15° with respect to the reference axis, the relative angle between the first and second polarizer is 15°. By rotating polarizer 32 such that the relative angle is reduced to 0°, light that is transmitted through polarizer 30 would be similarly transmitted through polarizer 32 without change. However, if the relative angle between polarizer 30 and polarizer 32 is changed to 90°, no light would be transmitted through the second polarizer 32 due to the crossed angles of polarization between tile two polarizers. Monitor 12 provides a background, two dimensional image. By rotating polarizer 32 about its optical axis, the visual intensity of the background image is enhanced or diminished based upon the relative angle between the polarizers. Therefore, the three dimensional effect simulated by the system is changed based upon the intensity of the background image. Another embodiment of the invention can be constructed by placing polarizer 30 in front of the monitor 14. Alternatively, the second polarizer 32 could be moved to a position intermediate polarizer 30 and optical processor 18.

Figure 3:
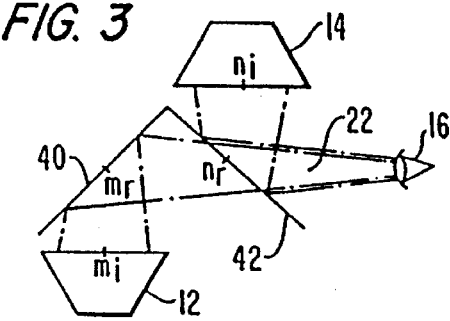
FIG. 3 schematically illustrates another embodiment of the optical viewing system wherein both image projectors are disposed at right angles with respect to the optical viewing path.

FIG. 3 schematically illustrates a system wherein image projectors 12 and 14 are at right angles with respect to optical viewing path 22. The optical processor in this embodiment includes half silvered mirror 40 and half silvered mirror 42. The relative angle between mirrors 40 and 42 is 90°. To optically align image projectors or monitors 12 and 14 with respect to optical viewing path 22, imagery lines intersecting mid point $m_i$ and $m_r$ and $n_i$ and $n_r$ of the monitors and mirrors are aligned to form a series of perpendicular lines with respect to a center line within optical viewing path 22. This alignment ensures that the foreground and background images are accurately overlaid into path 22.

Figure 4:
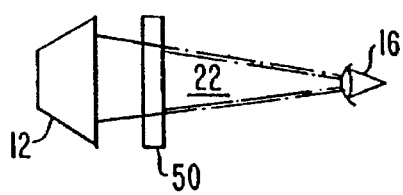
FIG. 4 illustrates another embodiment of the present invention wherein the foreground image is produced by a transparent LCD screen.

FIG. 4 schematically illustrates another embodiment of the present invention wherein screen 50 is part of the image producing system and the optical processor. The screen can be an LCD panel, PLZT or similar element having selectively operable light modulating structures disposed in an array. FIG. 4 shows an image projector, such as video monitor 12, which produces one two-dimensional image. That image is projected through the transparent portions of the screen to appear at the relatively more remote virtual distance from the observer. The "transparent" portions of the screen are preferably quite transparent but can also be side lighted, slightly translucent, etc. Translucence in the screen may further lend to the simulation of the three-dimensional scene, particularly for outdoor vistas, wherein the distant background may be slightly obscured by haze. In any event, when the screen is activated by an image signal supplied to the screen, selected portions darken (become opaque) to create the foreground image and the remaining portions at least substantially pass the background image. An LCD screen suitable for use according to the invention is commercially available, for example, from In Focus Systems, Inc. of Tualatin, Oreg. as Model No. PZV6448C+2. Kodak produces a Kodak Datashow HR/M Projection Pad that is also similar to the "transparent LCD screen" described herein. Other transparent screens with selectable pixels or light modulators are available from other manufacturers. The transparent screen 50 is the second image projector because when the screen is activated and an image control signal is applied, an image is generated by the screen and superimposed on the background image appearing through the remaining portions of the screen, which remain transparent. The screen is part of the optical processor since the screen is transparent to light and permits light and images generated and projected by monitor 12 to pass therethrough. Therefore, screen 50 combines the background image, produced by monitor 12, and the foreground image, produced by screen 50, and projects the resultant simulated three dimensional image into optical viewing path 22.

The image produced by screen 50 can be electronically processed readily. Therefore, the foreground image can be used to create special video effects, for example with computer generated figures projected over a background. Also, the image from the screen can be processed to conform to the size of the background screen.

Figure 16:
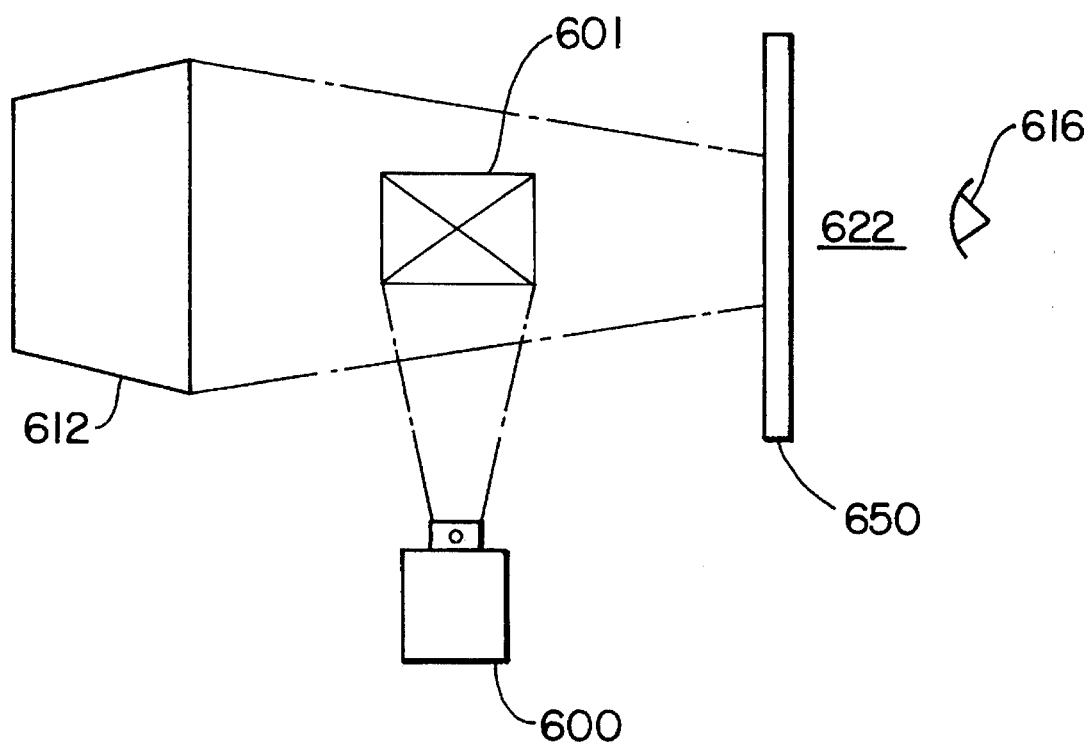
FIG. 16 illustrates another embodiment of the present invention wherein the foreground image is produced by a transparent LCD screen and a middle ground image is produced by a holographic image generator.

FIG. 16 schematically illustrates another embodiment of the present invention wherein screen 650 is part of the image producing system and the optical processor. The screen can be an LCD panel, PLZT or similar element having selectively operable light modulating structures disposed in an array. FIG. 16 shows an image projector such as video monitor 612, which produces one two-dimensional image. That image is projected through the transparent portions of the screen 650 to appear at the relatively more remote virtual distance from the observer. When the screen 650 is activated by an image signal supplied to the screen, selected portions darken (becomes opaque) to create the foreground image and the remaining portions at least substantially pass the background image as described above. Further, holographic image generator 600 is provided to generate a holographic image 601 between the video monitor 612 and screen 650. As with the image generated by the video monitor 612, the holographic image is projected through the transparent portions of the screen 650 to appear at a virtual distance from the observer between the images generated by monitor 612 and screen 650. In this manner, each of the images are overlaid into the viewing path 622 to create a three-dimensional effect for observation.

Figure 5:
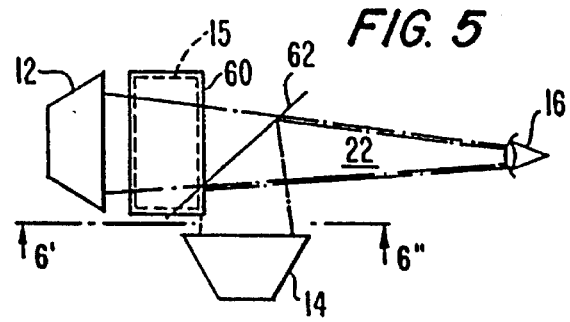
FIG. 5 illustrates a top view further embodiment of the present invention utilizing a plurality of image projectors and an optical processor system which overlays the two dimensional images from all the projectors.
Figure 6:
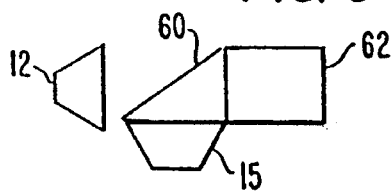
FIG. 6 schematically illustrates a side view of the embodiment of the optical viewing system from the perspective of section line 6'—6" in FIG. 5.

FIG. 5 illustrates a plurality of two dimensional image projectors and particularly schematically illustrates video monitors 12, 14 and 15. This viewing system includes two half silvered mirrors 60 and 62 as part of the optical processor that overlays the two dimensional images produced and projected, respectively, by monitors 12, 15 and 14. The screen on monitor 15 is generally parallel with the plane of the drawing. FIG. 6 schematically illustrates a side view of the system shown in FIG. 5. As shown in FIG. 6, the intermediate image produced by video monitor 15 is projected upwards toward half silvered mirror 60 which then reflects the image horizontally toward observer 16. Returning to FIG. 5, the image projected by video monitor 12 is transmitted through mirrors 60 and 62 into optical viewing path 22. The image projected by video monitor 14 is reflected by half silvered mirror 62 and is directed horizontally to observer 16 in optical viewing path 22. Therefore monitor 12 provides a background image, monitor 15 provides an intermediate image and monitor 14 provides a foreground image. Initially the intermediate image from monitor 15 is overlaid upon the background image from monitor 12 and then the foreground image from monitor 14 is overlaid upon the resulting composite image. Thus, a triple image is projected to observer 16 in optical viewing path 22. The principles of the present invention can be utilized with a plurality of monitors such that 4, 5, 6, etc. images can be overlaid and projected into a single optical viewing path toward observer 16. The simulated, three dimensional image effect is achieved as long as the virtual images from each monitor are at different distances with respect to the observer.

Figure 7:
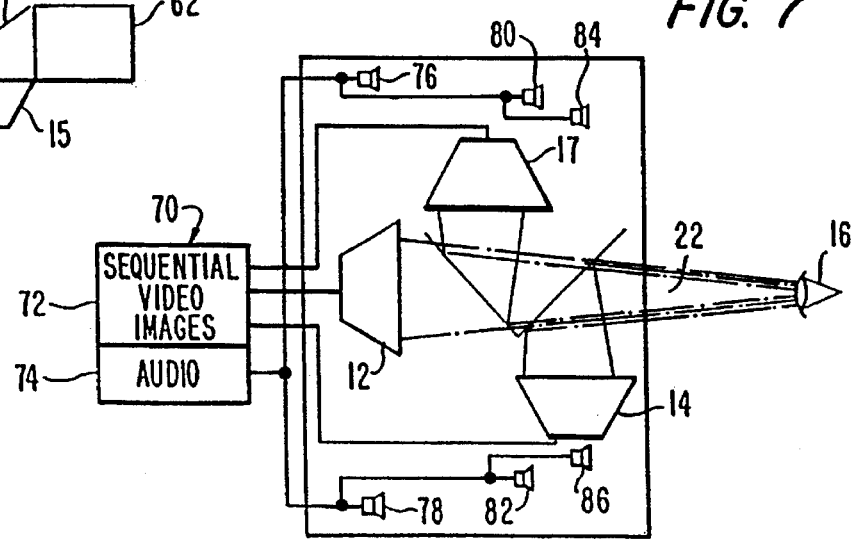
FIG. 7 schematically illustrates an optical viewing system having a plurality of image projectors and a plurality of audio sources.

FIG. 7 schematically illustrates a visual system combined with an audio system. Video and audio signal generator 70 includes a sequential video image generator 72 and an audio generator 74. The audio generator is coupled to a plurality of speakers, one of which is speaker 76. The visual images developed by video generator 72 may be linked, associated or coordinated with the audio signals produced by audio generator 74. For example, if a person were viewed as walking toward observer 16 by progressively and sequentially showing the person visually advancing from background monitor 12 to intermediate monitor 17 and then to foreground monitor 14, sound representing the person's footsteps could be initially generated by rear-disposed speakers 76, 78, then sequentially by intermediate speakers 80, 82 and finally by foreground speakers 84, 86. The multiple source audio system is associated with the sequentially presented two dimensional images that are combined and overlaid into optical viewing path 22. The audio signals are fed in coordination with the sequential video signals.

Figure 8:
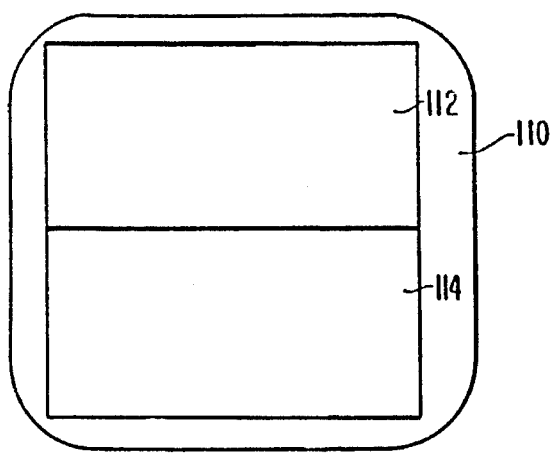
FIGS. 8, 9, 10 and 11 schematically illustrate the use of a single monitor having a split screen as other embodiments of the optical viewing system.
Figure 15:
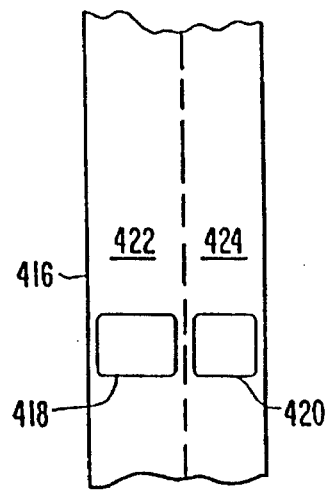
FIG. 15 illustrates dual track video tape carrying the aforementioned image signals.

FIGS. 8, 9, 10, and 11 illustrate the use of a single image projector that has a split screen such that the projector produces two two-dimensional images. FIG. 8 schematically shows an image display area 110 that can be the screen of a single video monitor. The image display area is divided into screen areas 112 and 114. If area 110 is the screen of a video monitor, the signals projected onto area 110 are separated to form two distinct screens 112 and 114.

Figure 9:
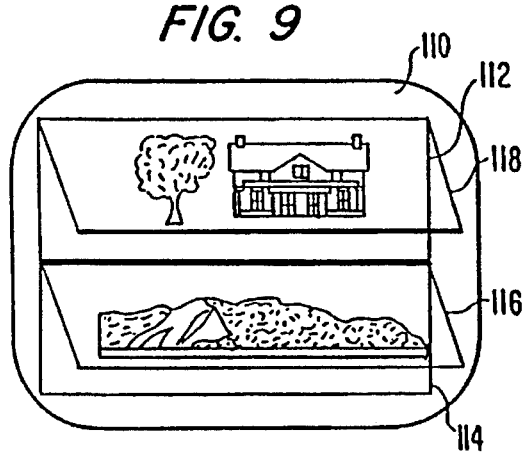
Figure 10:
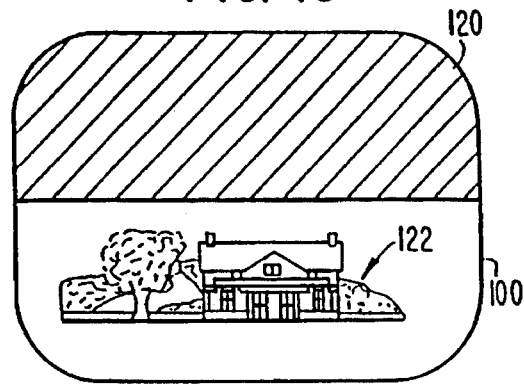

FIG. 9 schematically illustrates the placement of the optical processor, that includes half silvered mirror 116 and fully reflective mirror 118, over area 110. The foreground image of the house and tree on upper screen 112 is reflected and is directed at a 90° angle by half silvered mirror 116 and is simultaneously overlaid upon the background image of the mountain projected from lower screen 114. FIG. 10 is a view of monitor 100 as seen by the observer. A plate 120 blocks the view of upper screen 112 and mirror 118 that is part of the optical processor. The initial images from screens 112 and 114 and the composite image, generally designated by 122, illustrate that the foreground image initially developed by upper screen 112 need not be inverted from top to bottom or from left to right because the foreground house and tree scene is twice reflected. Care must be taken in optically processing the images in the embodiment shown in FIG. 9. To the observer, the optical distances must be different to achieve a 3D effect. This may be accomplished by moving the optical processor, mirrors 118 and 116 away from the screen surfaces.

Figure 11:
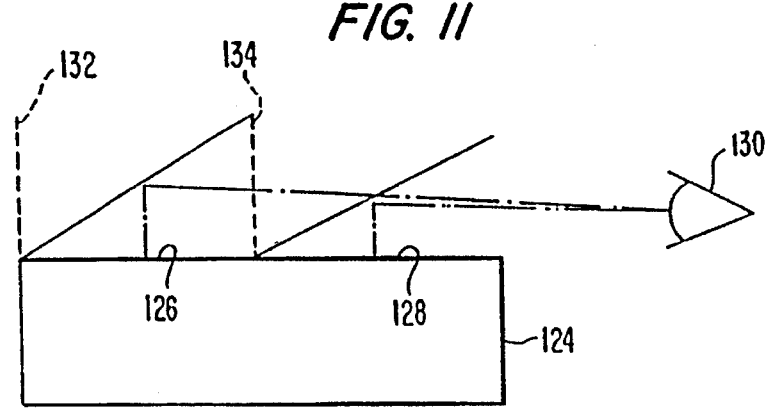

FIG. 11 illustrates another embodiment wherein video monitor 124 produces a background image on screen portion 126 and a foreground image on screen portion 128. The background image is seen by observer 130 at virtual plane 132, whereas the foreground image is seen at virtual plane 134. Since both images in this embodiment are reflected once, both images must be electronically or optically processed such that the initial images from screen 126 and 128 are vertically inverted and are inverted from left to right.

Figure 12:
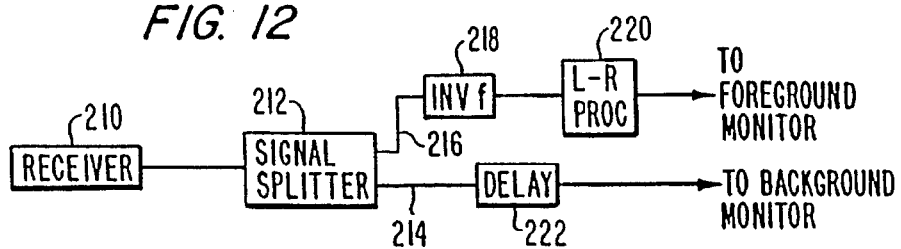
FIG. 12 illustrates, in block diagram form, an electronic processing system for the optical viewing system.

FIG. 12 illustrates, in block diagram form, an electronic circuit that processes these image signals. Receiver 210 essentially receives two television signals. Signal splitter 212 separates those signals and produces a background image signal on line 214 and a foreground image signal on line 216. Inverter circuit 218 can be used to invert the signal from top to bottom; left to right perspectives can be reversed by l-r processor/inverter 220. The resultant signal is applied to the foreground monitor. This circuit could be utilized with the optical system shown in FIG. 1 since the foreground image is inverted and left to right reversed by the optical processor. With respect to the background image signal, this signal must be time keyed to the foreground signal and hence delay circuit 222 is utilized. Dependent upon the convention adopted by the television broadcast stations, left to right inverter 220 could be eliminated in one optical viewing system given the particular configuration of the optical processors and the positioning of the video monitors in that system. In other configurations, both top to bottom inverter 218 and left to right processor 220 would be utilized to achieve the proper viewing characteristics. Otherwise, the image from one or more of the image projectors could be optically processed such that the proper view is presented for the observer. FIG. 11 requires both the foreground and background images to be processed in an inverted and left to right sense.

The optical viewing system in the embodiments described above could be further used with conventional, two dimensional television signals now commonly broadcast. Simply by disabling a portion of the screen or one of the monitors (contrast the embodiment in FIG. 11 to the embodiment in FIG. 1), the observer could continue to view conventional, two dimensional images rather than the simulated, three dimensional images. Also, the optical viewing system of the present invention can be used to generate special effects whereby the background and foreground images are reversed. In the example shown in FIGS. 9 and 10, the special effect would result in the mountain scene being placed over the house scene. This would result in an "impossible" image.

Figure 13:
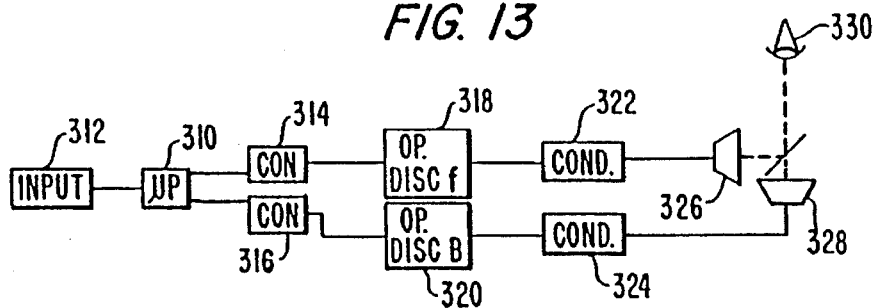
FIG. 13 illustrates, in block diagram form, an electronic processing system for another embodiment of the optical viewing system.

FIG. 13 illustrates the use of a computer or microprocessor 310 to generate dissimilar foreground and background images. Computer or microprocessor 310 (which includes a memory and other associated devices) is controlled by an input device 312. Microprocessor 310 commands controllers 314, 316 to generate control signals to select certain images from the foreground optical disc 318 and the background optical disc 320, respectively. The signals generated by the two optical discs are applied to conditioning circuits 322 and 324 and ultimately applied to monitors 326 and 328. Observer 330 would then be able to control the foreground and background visual scenes by changing input 312. The computer/microprocessor could be programmed to randomly select image signals which would result in randomly generated optical effects. Otherwise, the use of this optical viewing system is capable of eliminating the "blackout" or video blanking when the video laser disc is being initially accessed. During the accessing period, the other laser disc/display monitor would produce an image that is displayed on the corresponding monitor in the three dimensional system. In other words, one screen is always active.

Figure 14:
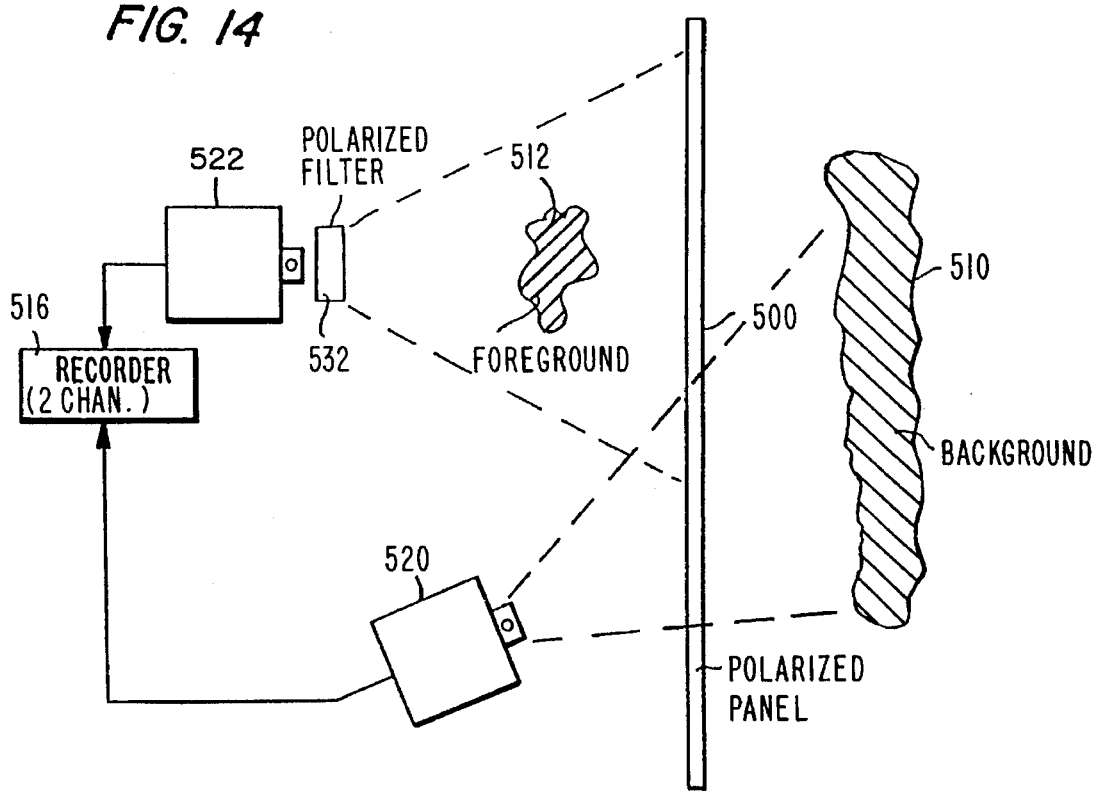
FIG. 14 schematically illustrates a system for producing a pair of two dimensional image signals that, when combined, can simulate three dimensional images.

FIG. 14 illustrates a system for producing two dimension image signals that can simulate three dimensional images. This arrangement can be used to separate the foreground and background components of a live production such that the two components can be later recombined according to the invention to obtain a simulated three dimensional presentation wherein the foreground component appears to be closer to the observer than the background component. The background set or scene 510 and the foreground set or scene 512 can be two dimensional or three dimensional. In the recorded version both the background and the foreground (standing alone apart from the other) will be two dimensional. However as combined at different apparent distances the three dimensional simulation is obtained. The system includes two cameras 520 and 522, and optical means for separating the foreground and background scenes from one another such that each of the foreground scene and the background scene is recorded exclusively by a respective one of the two cameras 520, 522. The outputs of cameras 520 and 522 are coupled to two recorders, or preferably to a single dual channel recorder 516 as shown.

There are various means by which the foreground and background can be separated. According to the embodiment shown the background image is viewed exclusively by camera 520 due to the placement and orientation of camera 520 to exclude the foreground scene. Background camera 520 simply views past the foreground scene to the background. The background scene is shielded from view by the foreground camera 522. A first transparent polarizing filter or panel 500, having a first polarizing angle, is disposed between the foreground and the background. A second transparent polarizing filter is disposed between the foreground image and the first polarizing panel. The second polarizing filter 532 has a polarizing angle which is out of phase with the angle of the first polarizing panel 500, and thus excludes the image of the background scene in the signal recorded by camera 522. Although the background camera 520 views through the polarizing panel 500, the background image is not excluded because camera 520 is not provided with an out-of-phase polarizing filter as is camera 522.

There are other means by which two images can be recorded separately by two cameras. Examples include the use of illumination in complementary colors, combined with corresponding filters to exclude at each respective camera, orientation of both the foreground and background cameras to view their respective scenes exclusively, etc.

When recording a foreground image as shown in FIG. 14, the combined effects of the polarizing panel 500 and polarizing filter 532 is to cause the background to appear black to camera 522. This presents no problem when the foreground and background images are to be recombined using reflection from a half silvered mirror for viewing the foreground, and viewing through the half silvered mirror to view the background. However, this technique will not work if the foreground image is to be projected in front of the background image using a liquid crystal display or the like wherein the darkened areas are provided by rendering opaque certain pixels in an otherwise transparent panel. The opaque pixels would block the view of the background. In order to overcome this problem it is possible to define a key color and to illuminate the front side of panel 100 in this color, whereby the foreground set is initially recorded on a matte background in the key color. By processing the image to convert all occurrences of the key color to white, the resulting image can be displayed on an opaque-pixel type display while allowing the background image to appear around the elements of the foreground scene. The key color (or the background color behind the foreground scene) can be made white, black or another key color defining the edges of a foreground image to be superimposed on a background matte, depending on the mode of display, and specifically whether the observer will view through a positive or negative form of foreground display element. A liquid crystal display (with controllably opaque pixels) is a negative form of display. Gas discharge displays and controllable electroluminescent displays (with controllably illuminated pixels) are examples of positive forms of display.

According to the embodiment of FIG. 14, both the foreground information and the background information are stored on a single storage medium 516, which can be analog or digital. This can be a dual channel video tape recording means or another form of storage. For example, a video laser disk can be used to store the foreground and background in a sampled digital format. The information can be stored in alternating data packets for successive frames of foreground and background video information, respectively. As another possibility the foreground and background can be stored in successive tracks for reading via a multi-head reader. A further possibility is to store the information for the foreground and the background on opposite sides of a double sided media such as a laser disk.

In the optical viewing system and the recording system, the foreground image must be specially processed such that when that image is projected towards the observer, the background image is only blocked by the relevant portions of the foreground. To display a person in the foreground using the half silver mirror method, the person may be photographed against a black background. The "black background" in the foreground image results in light transmissive regions in the image, thereby permitting the background image to be projected towards the observer.

The problem discussed above is encountered in viewing video foreground images through a negative type display (with darkened pixels) wherein the background image can be occluded by the dark portions of the foreground surrounding the foreground image. This is correctable by providing the foreground image with a white area around the foreground scene elements, whereby the pixels in the negative-type view-through foreground display remain transparent. The white surround area can be provided when the foreground image is initially recorded, or can be added thereafter to replace a different key color. However, in a negative-type view-through display, there is a further problem which is encountered when one or more elements in the foreground are in fact white in color. These lighter areas in the foreground scene become the more transparent areas in the foreground display means, and accordingly increase the transmission of the background image to the observer in these areas. An additional masking layer can be built into the array, the masking layer being arranged to block transmission of the background image through those areas which are intended to represent an opaque but light-colored foreground object. The masking layer can be provided with edge lighting or the like, in order to increase the light level behind the light colored foreground feature while deemphasizing darker features in the background. In this manner, the background does not appear through the foreground as a phantom or bleed-through image.

Another possibility is to modulate the signal applied to the background image such that opaque but light-colored foreground areas are logically ORed with the background signal to provide a light background behind the foreground object notwithstanding a dark background otherwise provided in the area. These anti-phantom procedures are useful provided the observer is located at a predetermined position relative to the projection axis, but may cause edge effects if the background is altered as necessary for one angle of view but viewed from a different angle.

In connection with an arrangement wherein at least a part of the composite layered image is processed in the form of video, it is possible to use the video blanking interval to encode part of the information needed. For example, in the event the background image is a video encoded scene and the foreground image is the image of a figure or sprite which is to move about in front of the background, the video blanking interval of the video background can be used to encode the position of the foreground figure, to encode the screen positions of each pixel to be made opaque (or transparent), or even to transmit a bitmap of positions and intensities. Whereas a data representation of a figure or the like in the foreground normally will require substantially less information than a full resolution video picture (as in the background), there is adequate time in the video blanking interval to encode at least simple foreground image information. The same idea can be applied to a foreground video signal and more limited encoded background.

A wide variety of lighting arrangements are possible in conjunction with an LCD or similar display apparatus. For example, the illuminations can be of any type (incandescent, fluorescent, polarized, etc.), intensity, angle or position relative to the LCD screen (front, back, oblique, edge, etc.), in order to achieve the desired effect.

The invention has been discussed with reference to preferred embodiments having particular devices for producing the respective image layers, and for viewing the closer image(s) in front of the more remote image(s). It should be appreciated that the invention is subject to a number of variations within the spirit and scope of the invention. For example, various optical arrangements can be provided in order to vary the nature of the display apparatus while displaying images over one another at different apparent distances from the observer, including lens or prism arrangements which diffract light from one or more display devices- Although the preferred embodiments concern flat screens and flat panels, it is also possible to apply the invention to a curved screen arrangement. Whereas the respective image layers of the preferred embodiments ere entirely two dimensional, it is likewise possible to provide a three dimensional image for one or more of the layers, e.g., by displaying a foreground holographic three dimensional image in front of a background. The invention can be applied to these display particulars as well as to other emerging technologies, and accordingly reference should be made to the appended claims rather than the discussion of preferred examples in order to assess the scope of the invention in which exclusive rights are claimed.

We claim:

1. An optical viewing system for producing a simulated three dimensional image, comprising:

first means for displaying an image on a first electronic display device;

at least one second means for displaying an image on at least one second electronic display device, said at least one second electronic display device being a substantially transparent display device, whereby an observer can view through transparent areas of the second electronic display device;

said first and second electronic display devices being located at different, predetermined locations along an optical viewing path such that the image displayed by said first electronic display device is projected through said at least one second electronic display device;

wherein said first electronic display device includes an image projector and said second electronic display device includes a controllable pixel display spaced therefrom, said controllable pixel display comprising a positive pixel display panel having a field of pixel elements which are controllably illuminated, said controllable pixel display being substantially transparent such that the image produced by the controllable pixel display is overlaid upon the image produced by said image projector.

2. A recording system operable to produce a plurality of images for simulating a three dimensional scene, comprising:

at least two image recorder channels, each being operable to record a respective image signal, each said recorder channel being coupled to an output of a corresponding image sensing apparatus;

optical means for separating images at different depths of a three dimensional scene, for presentation of the images exclusively to one of the image sensing apparatus, whereby the images at said different depths can be projected over one another to simulate the three dimensional scene;

wherein the image signals from a first recorder channel are stored on a first side of an optical disk and the image signals from a second recorder channel are stored on a second side of said optical disk.

3. An optical viewing system for producing a simulated three-dimensional image comprising:

at least one first means for displaying a two-dimensional image on a first electronic display device at a first predetermined distance from an observer;

at least one second means for displaying a three-dimensional holographic image at a second predetermined distance from an observer;

said holographic image superimposed over said two-dimensional image in a viewing path to create a three-dimensional composite image when viewed by an observer;

wherein said first means for displaying a two-dimensional image includes a controllable pixel display being substantially transparent, and the first predetermined distance is less than the second predetermined distance, such that the image produced by the controllable pixel display is overlaid upon the three-dimensional holographic image.

4. An optical viewing system for producing a simulated three-dimensional image comprising:

at least one first means for displaying a two-dimensional image on a first electronic display device at a first predetermined distance from an observer;

at least one second means for displaying a three-dimensional holographic image at a second predetermined distance from an observer;

said holographic image superimposed over said two-dimensional image in a viewing path to create a three-dimensional composite image when viewed by an observer;

wherein said first means for displaying a two-dimensional image includes a controllable pixel display being substantially transparent and the first predetermined distance is greater than the second predetermined distance such that the three-dimensional holographic image is overlaid upon the image produced by the controllable pixel display.

5. An optical viewing system for producing a simulated three dimensional image, comprising:

first means for displaying an image on a first electronic display device;

at least one second means for displaying an image on at least one second electronic display device, said at least one second electronic display device being a substantially transparent display device, whereby an observer can view through transparent areas of the second electronic display device;

said first and second electronic display devices being located at different, predetermined locations along an optical viewing path such that the image displayed by said first electronic display device is projected through said at least one second electronic display device;

wherein a pixel masking array is provided between said first electronic display device and said at least one second electronic display device, said pixel masking array provided to mask at least a portion of an image displayed on said first electronic display device, whereby darker colored images displayed on said first electronic display device are prevented from bleeding through and interfering with opaque but light-colored images displayed on said at least one second electronic display device.

6. An optical viewing system for producing a simulated three dimensional image, comprising:

first means for displaying an image on a first electronic display device;

at least one second means for displaying an image on at least one second electronic display device, said at least one second electronic display device being a substantially transparent display device, whereby an observer can view through transparent areas of the second electronic display device;

said first and second electronic display devices being located at different, predetermined locations along an optical viewing path such that the image displayed by said first electronic display device is projected through said at least one second electronic display device;

wherein means are provided for comparing opaque but light-colored pixels displayed on said at least one second electronic display device with pixels displayed on said first electronic display, and means are provided for selectively altering darker pixels displayed on said first electronic display device to minimize bleed-through of darker pixels on said first electronic display device into lighter pixels on said second electronic display device.

7. An optical viewing system for producing a simulated three-dimensional image comprising:

at least one first means for displaying a two-dimensional image on a first electronic display device at a first predetermined distance from an observer;

at least one second means for displaying a three-dimensional holographic image at a second predetermined distance from an observer;

wherein each of said display means are located at different, predetermined locations on an optical viewing path and wherein the image displayed by said at least one second means for displaying is projected through said at least one first means for displaying, to create a three-dimensional composite image when viewed by an observer.

* * * * *